(12) United States Patent
Levkoff et al.

(10) Patent No.: US 7,117,245 B1
(45) Date of Patent: Oct. 3, 2006

(54) GLOBAL COMMUNICATION METHOD AND SYSTEM

(75) Inventors: Jonathan Stephen Levkoff, Hilton Head, SC (US); Peter Rinfret, Greenwich, CT (US); Michael Elling, Mendham, NJ (US); Sunir Kochhar, Franklin, TN (US)

(73) Assignee: Iris Wireless, LLC, Greenwich, CT (US)

( * ) Notice: Subject to any disclaimer, the term of this patent is extended or adjusted under 35 U.S.C. 154(b) by 931 days.

(21) Appl. No.: 09/610,402

(22) Filed: Jul. 5, 2000

(51) Int. Cl.
*G06F 15/16* (2006.01)

(52) U.S. Cl. .................................... 709/206

(58) Field of Classification Search ................ 709/203, 709/245, 217–219, 206–207, 238–239, 225; 707/1, 3–10; 370/351–352; 379/67.1, 265.1
See application file for complete search history.

(56) References Cited

U.S. PATENT DOCUMENTS

| | | | |
|---|---|---|---|
| 5,425,028 A | 6/1995 | Britton et al. | |
| 5,487,100 A * | 1/1996 | Kane | 340/7.23 |
| 5,548,789 A * | 8/1996 | Nakanura | 709/206 |
| 5,742,905 A | 4/1998 | Pepe et al. | |
| 5,764,906 A * | 6/1998 | Edelstein et al. | 709/219 |
| 5,819,110 A | 10/1998 | Motoyama | |
| 6,049,834 A | 4/2000 | Khabardar et al. | |
| 6,061,738 A * | 5/2000 | Osaku et al. | 709/245 |
| 6,101,548 A * | 8/2000 | Okada | 709/236 |
| 6,421,339 B1 * | 7/2002 | Thomas | 370/352 |
| 6,714,793 B1 | 3/2004 | Carey et al. | |

* cited by examiner

*Primary Examiner*—Andrew Caldwell
*Assistant Examiner*—Hieu C. Le
(74) *Attorney, Agent, or Firm*—Skadden, Arps, Slate, Meagher & Flom LLP

(57) ABSTRACT

A global messaging system delivers messages to user devices by employing aliases, permissions, and protocols. A sender sends a message to an alias. The message is transmitted to devices associated with the alias. The system compares the message length to a maximum message length and modifies the transmission of the message when the message length exceeds the maximum message length by sending a concatenated message and adding a header to the message. Accordingly, messages can be delivered to recipients without the need to know a physical device address or have the ability to directly communicate with the device.

2 Claims, 7 Drawing Sheets

GLOBAL COMMUNICATION METHOD AND SYSTEM

FIELD OF THE INVENTION

The present invention relates to communication systems. Particularly, the invention relates to a global messaging system.

BACKGROUND

Individuals use various devices to receive video, audio, and text, messages (delayed or real-time). For example, a typical individual can receive messages at several locations by way of several devices. There is usually a telephone in the individual's residence, office, and car. The individual may also carry a mobile phone, a pager, and a Personal Data Assistant (PALM PILOT™ for example). In addition, the individual may have one or more e-mail accounts, a fax machine, and other communication devices. Since, the individual may not have access to all devices at all times, it may take several communication attempts before a message reaches the person. Therefore, there is a need for a method and system, which ensures that a message reaches an individual regardless of the device or devices available to the individual.

Message networks, such as pager systems, allow customers to receive messages on personal devices. The messages are usually delivered to the network by a sender directly contacting a sending interface of the network such as a telephone paging system. Several such networks allow users to send messages by employing the personal communication devices. However, such capabilities are usually limited to sending messages only to users on the same system. Thus, there is a need for a method and system for sending messages to users regardless of whether they are on the same network as the sender. In addition, there is a need for a method and system for delivering a message to a device on a system that is not reachable from the system that is delivering the message.

SUMMARY

Thus, in accordance with the invention, there is provided a system for facilitating the transmission of messages to recipients regardless of whether the recipient has available a particular one of the available devices. The system allows for a single message to be sent to any or all devices associated with the recipient or group of recipients. Recipients define aliases that are associated with device sets. In one embodiment, the message is transmitted to all defined devices that are associated with an alias that the sender has selected. In addition, the system allows the recipient to control the set of devices by which a message can be received from a particular sender or group of senders. In another embodiment, a group of recipients receives a single message by the transmission of the message to the devices associated with each group member.

In one embodiment, the invention provides a method for transmitting a message to a recipient which is associated with at least one identifier and the identifier is associated with at least one communication device. The method includes receiving a message and a recipient identifier for the message. The recipient identifier is associated with at least one communication device. The method verifies that the recipient identifier is available to the system and verifies that the sender has permission to send a message to the identifier by referring to the permission associated with the identifier. The method then transmits the message to at least one communication device associated with the identifier. The method retrieves a maximum message length for a communication device associated with the identifier and determining the message length of the received message. The method compares the message length of the received message to the maximum message length and modifies the transmission of the message when the message length of the received message exceeds the maximum message length, by sending a concatenated message.

In one embodiment, the invention includes a method for communicating messages to recipients that employ message receiving devices on service networks where the service networks employ various protocols. The method assigns a unique alias to a recipient and associates at least one communications device with the alias. The method includes transmitting a message to a communication device by employing a protocol (e.g., FLEX, REFLEX, WAP, PDMA, POCSAG, GSM, and SMTP) and a device address. Finally, the method associates at least one messaging permission with the alias. In an alternate embodiment, the method also associates a messaging permission with a recipient device.

In another embodiment, the invention provides a method for transmitting a message to a recipient alias. The alias is associated with at least one permission criteria and with at least one communication device. The method includes selecting a user alias, verifying the selected alias, compiling a message for the user, checking the message length of the complied message, checking the permission criteria associated with the alias, sending the message to a user device associated with the selected alias, and notifying the sender of the receipt of the message.

In an alternate embodiment, the invention provides a method for creating a user group that receives messages intended for the group. The method includes assigning a group owner to the group, assigning message permission criteria for the group, adding members to the group by entering aliases of registered members, adding members to the group by entering device addresses for unregistered members, assigning a group inclusion criteria to the group, and entering a connection type for the group. The group members may be individual recipients or a group.

In one embodiment, the invention provides a method for facilitating the transmission of a message by a service provider network to a user on a foreign network where the foreign network cannot be directly reached by the service provider network. The method includes storing a device address list and storing aliases corresponding to devices in the address list. The method then searches for a device address in the device address list when the device address is the recipient address of a message and the device address belongs to a foreign network. The method retrieves the alias corresponding to the device address from the device address list and substitutes the alias for the recipient address of the message. The method then employs a third party service to transmit the message to a user on a foreign network where the third party service transmits messages to users by employing alias-based addressing. In another embodiment, where wireless telephony is employed, the message is directly forwarded to the intended recipient devices.

The invention allows for the communication from any sender device to any recipient device, regardless of the protocol that the recipient device is operating under as long as the client device can communicate with the messaging system. Users of the messaging system have a universal address that remains constant no matter what devices, device addresses, or device service providers are acquired or abandoned by the user.

DETAILED DESCRIPTION

1. Glossary of Terms and Acronyms

The following terms and acronyms are used throughout the detailed description:

Client-Server. A model of interaction in a distributed system in which a program at one site sends a request to a program at another site and waits for a response. The requesting program is called the "client" and the program which responds to the request is called the "server." In the context of the World Wide Web (discussed below), the client is a "Web browser" (or simply "browser"), or another network enabled application or web-enabled device, which runs on a computer of a user; the program which responses to browser requests by serving Web pages is commonly referred to as a "Web server." The client-server model commonly includes a network that facilitates the communication between the programs. The network may operate under various protocols and may be facilitated in various configurations. In the context of a wireline network, the network employs an HTTP protocol (discussed below) in conjunction with TCP/IP, and is configured as a packet switching network.

Internet. A collection of interconnected (public and/or private) networks that are linked together by a set of standard protocols (such as TCP/IP and HTTP) to form a global, distributed network. (While this term is intended to refer to what is now commonly known as the Internet, it is also intended to encompass variations which may be made in the future, including changes and additions to existing standard protocols, such as the Wireless Application Protocol (WAP) and Bluetooth technology.)

World Wide Web ("Web"). Used herein to refer generally to both (i) a distributed collection of interlinked, user-viewable hypertext documents (commonly referred to as Web documents or Web pages) that are accessible via the Internet, and (ii) the client and server software components which provide user access to such documents using standardized Internet protocols. Currently, the primary standard protocol for allowing applications to locate and acquire Web documents is HTTP, and the Web pages are encoded using HTML. However, the terms "Web" and "World Wide Web" are intended to encompass future markup languages and transport protocols which may be used in place of (or in addition to) HTML and HTTP. Other markup languages include Extensible Markup Language (XML), and Wireless Markup Language (WML).

Web Site. A computer system that serves informational content over a network using the standard protocols of the World Wide Web. As used herein, the term is generally intended to encompass both (i) the hardware/software server components that serve the informational content over the network, and (ii) the "back-end" hardware/software components, including any non-standard or specialized components, that interact with the server components to perform services for Web site users.

System Configuration and Operation

Figure 1:
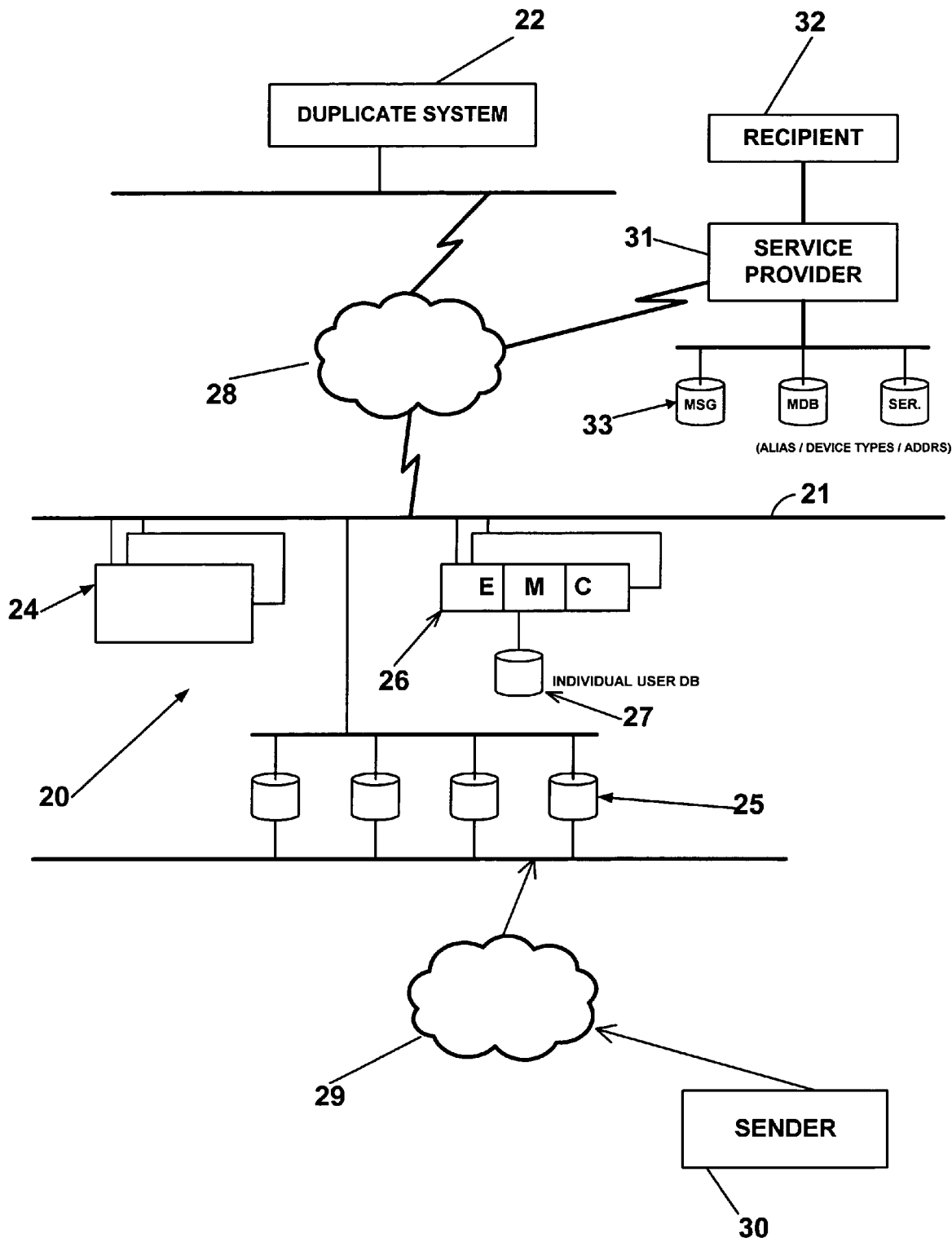
FIG. 1 illustrates a client-server configuration for the transmission of messages in accordance with the invention.

FIG. 1 illustrates the structure of a message system 20 in accordance with the invention. The message system 20 facilitates the transmission of a message from a sender device 30 to at least one recipient device 32 by employing a database 26, and network connections 28, 29. The sender device 30 implements a client device that communicates data to the server system 20. Sender devices include wireline and wireless devices. The sender device 30 preferably includes an operating environment under which a thin-client application is executed. In another embodiment, the sender device does not include an operating environment whereby message data is communicated to the server system 20 over a voice channel. A message can be received by several devices that are associated with a single recipient as defined by the message system's database. Accordingly, the system provides for the reception of a message by user devices regardless of the protocol that the user device is operating under.

The system 20 includes a plurality of routers 25, a system bus 21, a plurality of transaction servers 24, and a database 26. The routers 25 are coupled to the system bus to communicate data with the communication links 28, 29. In one embodiment, the communication links 28, 29 are Internet connections. In one embodiment, the routers 25 may be supplied by CISCO, LUCENT, or a number of other vendors. The routers 25 facilitate the communication of data between the message system 25 and the network connections 28, 29. In one embodiment, the routers 25 provide security, data compression, data packaging, and protocol compliance functions.

The transaction servers 24 are coupled to the system bus so as to facilitate the communication with the database 26 and the routers 25. In one embodiment, the transaction servers 24 are HEWLETT PACKARD N class clustered enterprise BPlux servers. The transactions servers 24 preferably implement a website that allows users the send and receive messages in accordance with the invention. In another embodiment, the transaction servers implement a client-server system server to communicate with client devices that execute thin-client communication applications. The servers preferably provide HTML pages in response to the submission of HTML requests by user systems. For example, in response to the submission of a url for a home page the servers 24 transmit a startup web-page. In another embodiment, where the sender device is running a thin-client application communication data is by HTTP.

The database 26 includes various data structures for storing information that is employed by the system 20 to send and receive messages. In one embodiment, the database includes a user database 24, a message database, a device database, a protocols database, a history database, and a groups database. As may be appreciated, other databases may be employed as may be required for the operation of the system in accordance with the invention. In addition, the web-site implementation of the server 20 includes certain databases associated with the operation of a commercial web-site as is known. Such databases include, for example, graphics and advertisement databases. In one embodiment, the database 26 is stored on an EMC storage array network (including Symmetrix, Connectrix & Cellera devices).

The message system 20 is further coupled to duplicate systems 22 by the network connection 28. The duplicate systems 22 preferably provide substantially the same services as the primary system 20. In one embodiment, the duplicate systems 22 are an exact copy of the primary system 20. In this embodiment, several such duplicate systems 22 are in operation concurrently. Thus, the duplication of servers provides for a no-downtime-cluster arrangement of systems. In addition, the systems can be configured to provide load balancing functionality so as to ensure consistent performance.

The message system 20 is advantageously coupled to a service provider 31 by a network interface 28. The service provider 31 is associated with a recipient device 32 and a local database 33. Preferably, the recipient device 32 is for a subscriber of the service provider 31. The message system 20 is coupled to several service providers so as to communicate with a plurality of devices on various service networks. As may further be appreciated, a recipient may have more than one device on a service network whereby a message intended for the recipient can be transmitted to any one of several devices on the same service network in accordance with the alias definition (discussed below).

The service provider 31 is associated with a message database, a service database, and a Remote Interface Module. The message database is used to store messages intended for recipient devices on the service network. In another embodiment, the message database stores messages sent by devices on the service network when the devices include message transmission capabilities. The service database is used to store subscriber information as may be needed for the provision of services on the service network. For example, the service database stores subscription levels, subscription rates, and device addresses.

The Remote Interface Module is preferably provided to the service provider by the message system 20 so as to facilitate the transmission of messages to recipients on the message system 20. Messages sent by devices on a particular service provider network may be intended for devices that are on another network, perhaps running under a different protocol. Generally when such messages are received by a service provider, the message is dropped because the service provider cannot communicate with the foreign network. The system of the present invention allows for the transmission of a message to a foreign network. The service provider has available the Remote Interface Module which stores device addresses and corresponding aliases. When a message is intended for a foreign system, the service provider searches the Remote Interface Module for the recipient address. The message is then sent to the alias associated with the address by employing the message system (discussed below).

Figure 2A:
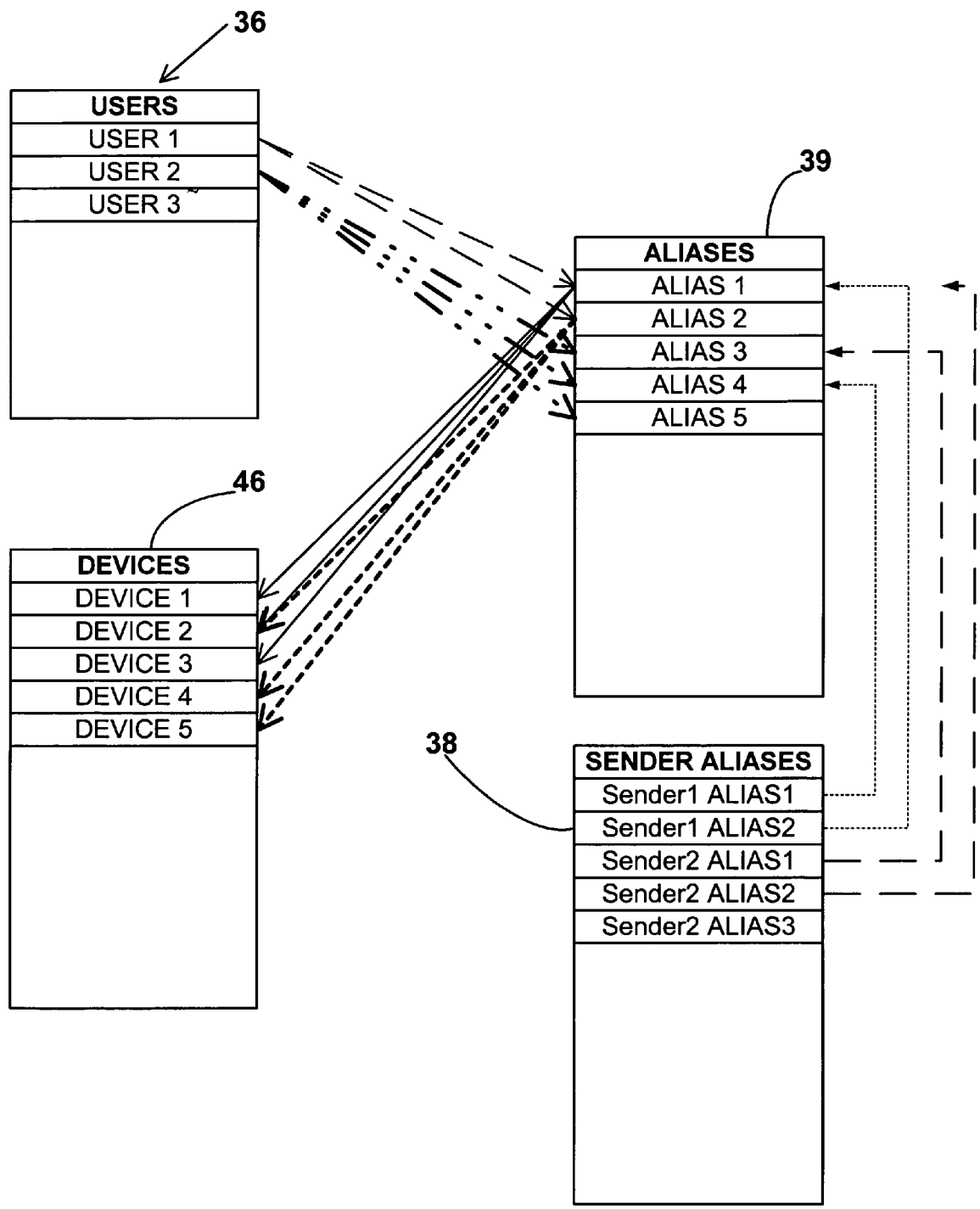
FIG. 2 illustrates the data structures associated with recipient records in a messaging system of the invention.

FIG. 2A illustrates the data structures 36, 39, 46 associated with users of the message system 20. Recipients are preferably assigned a unique user identifier. In one embodiment, the unique user identifier is employed as an index to the recipient's records. A users table 36 is advantageously employed for storing user identifiers in addition to user information. The user information preferably includes user personal information, billing information, and group memberships. Such personal information includes calendar information, appointment contacts, history of old messages, messages for later transmission, and security data such as fingerprints. The user identifiers in the user table 36 are preferably each associated with at least one alias. In one embodiment, the alias is a unique alphanumeric identifier. In one embodiment, the alias is a unique identifier (across all users) that is used to define a set of devices and permissions, as is further discussed below. The alias is either generated by the system or is created by the user and is later verified for uniqueness by the system. In one embodiment, the unique identifier is a permanent identifier ("permanent-ID") which is permanently associated with an individual across any change, such as a name change, address change, etc.

Users can have more than one alias so as to define several sets of devices. A user may, for example, wish to define one set of devices for receiving messages from family members and a second set of devices for receiving messages from others. For example, in the illustrated example user1 is associated with alias1 and alias2 while user2 is associated with alias3, alias4, and alias5.

In one embodiment, the aliases table 39 further stores, or is associated with, permission information that is used to control the transmission of messages to the alias. The permissions may be based on a sender, whereby the reception of messages from certain senders is enabled in accordance with a criteria. For example, the criteria may refer to dates, times, profile, and group membership. In another embodiment, the permissions are based on a sending device, whereby certain devices are allowed to transmit messages to the alias. For example, a permission set may enable messages only from text based devices, or only from devices that belong to a certain service network. In yet another embodiment, the permissions are based on a recipient device, whereby certain recipient devices are enabled in accordance with the criteria. For example, a recipient may enable a cellular phone from 9 am to 10 pm, and only allow reception of messages by a pager, after 10 pm.

As may be appreciated, the permission criteria depend on the level of information available to the system regarding senders and recipients. As more information is available to the system, more criteria can be applied to the transmission of messages by either sender or recipient.

Senders can define aliases for recipients, which are associated with recipient aliases. The sender aliases are stored in a senders table 38. The senders table stores sender-defined aliases corresponding to recipient aliases. The aliases are only unique as to the particular sender that defined the alias. For example, a sender may wish to assign an alias for the recipient alias "Joe_Smith_99832." Thus, the sender defines an alias "Joe," which correspond to the recipient alias "Joe_Smith_99832." When a sender1 message carries the alias "Joe," the recipient alias is substituted for the sender alias so as to deliver the message to the proper devices. As may be appreciated, two senders can use the same alias as a sender alias while referring to two different recipient aliases. In addition, as illustrated in FIG. 2A, two different sender aliases can refer to the same recipient alias.

A recipient alias (herein "alias") is used to define a set of devices to which messages carrying the alias are directed. Accordingly, each alias is associated with at least one device from the devices table 46. In the illustrated example, alias 1 is associated with device 1, device 2, and device 3 while alias 2 is associated with device 2, device 4, and device 5. Accordingly a message that is transmitted to alias 1 may be received by device 1, device 2, and device 3. As may further be appreciated the device sets for aliases are not mutually exclusive as a number of aliases may be associated with the same device or devices. For example, in the illustrated data, alias 1 and alias 2 are both associated with device 2.

In one embodiment, the devices table 46 stores the device identifier along with data relating to device protocol, device address, and device serial number. In another embodiment, the devices are associated with permissions so as to control the reception of messages at a device level, as discussed above. In this embodiment, permission data is included in the device record, or is associated therewith. Alternatively, a separate permission table may be employed to store permission data. In yet another embodiment, a maximum message length is defined for devices.

Figure 2B:
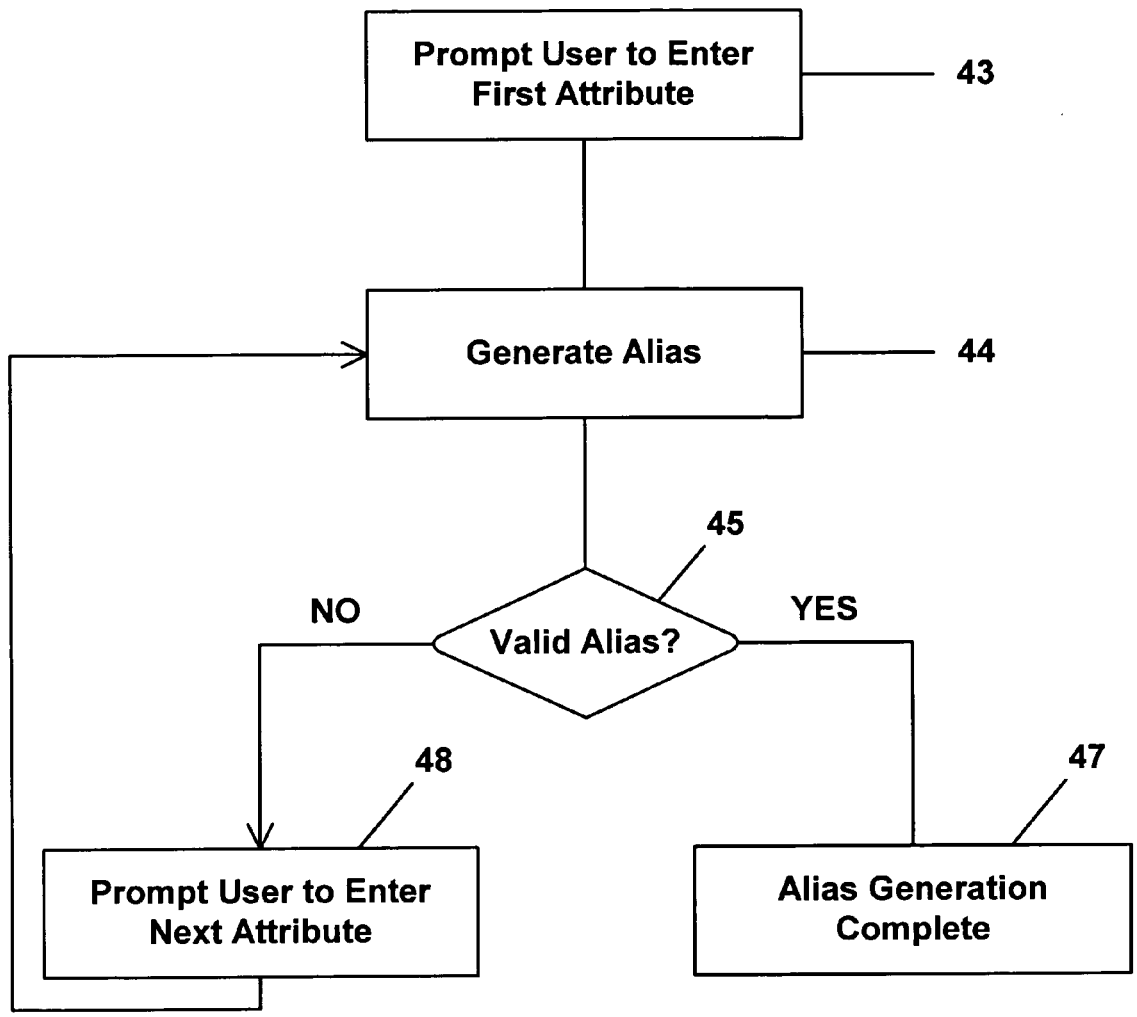

FIG. 2-B illustrates a process for generating a valid alias in accordance with an embodiment of the invention. A valid alias is one that complies with the requirements for an alias at the particular category. For example, a valid global user alias is unique between all other global aliases. Likewise, a second-level alias such as a sender defined alias is only unique between all other aliases of the same level.

The system generates a valid alias by repeatedly prompting the user to enter information, which is used to generate an alias, until the generated alias is valid (within its intended use). The system prompts the user to enter a first attribute from several attributes associated with a group or individual (step 43). For example, an individual may be prompted to enter a first name, last name, mothers' maiden name, pet's name, digits, etc. The system generates an alias by employing the user information (step 44). The system then determines whether the alias is valid (step 45). If the alias is valid, the alias generation is completed whereby the alias can be employed by the system (step 47). If the alias is not valid, the system prompts the user to enter information for another attribute (step 48). The system then generates a new alias (step 44) and determines whether the new alias is valid (step 45). The process is repeated until a valid alias is generated. As may be appreciated, the user may be prompted to enter information for several attributes in one step rather than single-step through the attributes. Furthermore, attributes employed to generate a group alias may be different from those employed to generate an individual alias.

The message system 20 advantageously includes data structures for storing history data for user devices. When a user changes a device, such as when a new pager is bought or when the user changes cellular networks, the history information is stored by the system. Accordingly, when a message carries such old device address, for an old cellular phone for example, the system can forward the message to the proper device by employing the history table.

The message system 20 further includes a group table that tracks group information. In one embodiment, a message can be transmitted to a group rather than to a particular alias. The group defines a collection of user devices to which messages are forwarded. In one embodiment, each group is assigned an alias. Messages that carry the group alias are forwarded to group members by referring to the group attributes.

Figure 3:
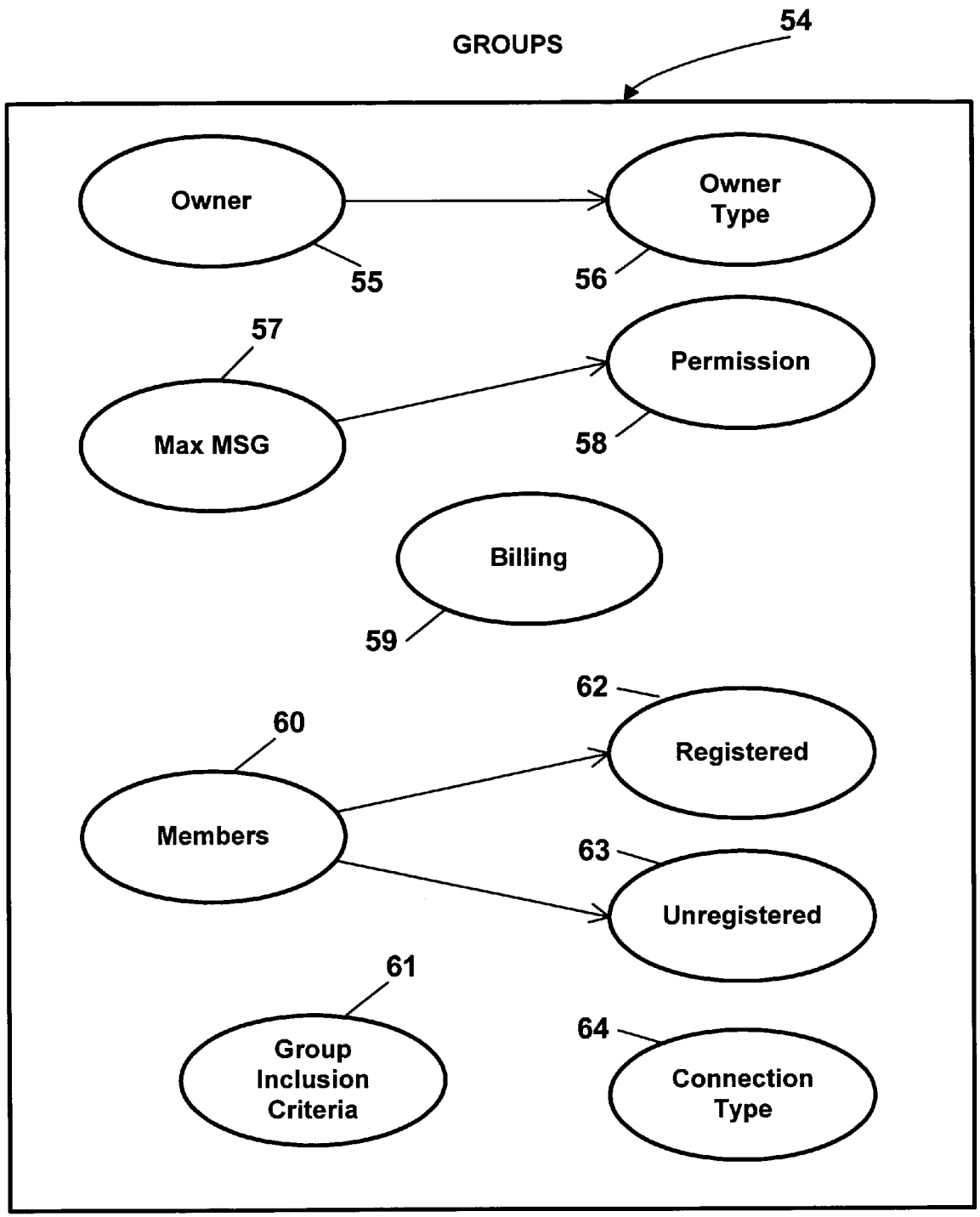
FIG. 3 illustrates the attributes associated with a group definition in accordance with the invention.

FIG. 3 illustrates the attributes associated with a group definition 54. Each group has a group owner 55. The group owner 55 is associated with an owner type 56. In one embodiment, the owner type 56 may be an individual user, a corporation, or a group. The group is also associated with a maximum message definition 57. The maximum message definition 57 can take the form of permissions 58, which define, in part, how group members can transmit messages, who can transmit messages to the group members, and when messages can be transmitted to the group. The group definition 54 also includes a billing definition that is used to set payment transaction data for the group.

Group members 60 are one of two types, a registered member 62, or an unregistered member 63. Registered members 62 are those that have provided to the message system at least one alias and at least one device data for the alias. Unregistered members 63 are associated with a device address and protocol only.

The group is preferably associated with an inclusion criteria 61, which controls membership in the group. In one embodiment, the inclusion criteria 61 is based on the user profile for the user wishing to join the group. For example, an inclusion criteria 61 may only allow users from New York to join the group. In another embodiment, the inclusion criteria is a device type, or a device protocol. The inclusion criteria is preferable automatically applied by the systems when users request to join the group.

In one embodiment, a sender control membership in a group to which it transmits a message. Thus, the sender can control the reception of messages by a group. In addition, recipients can control the reception of messages from a group by setting device or alias permissions.

The group definition also includes a connection type 64 that defines how individual members connect to the message service. The connection type 64 is advantageously used to facilitate more efficient messaging between the members of the group.

Figure 4:
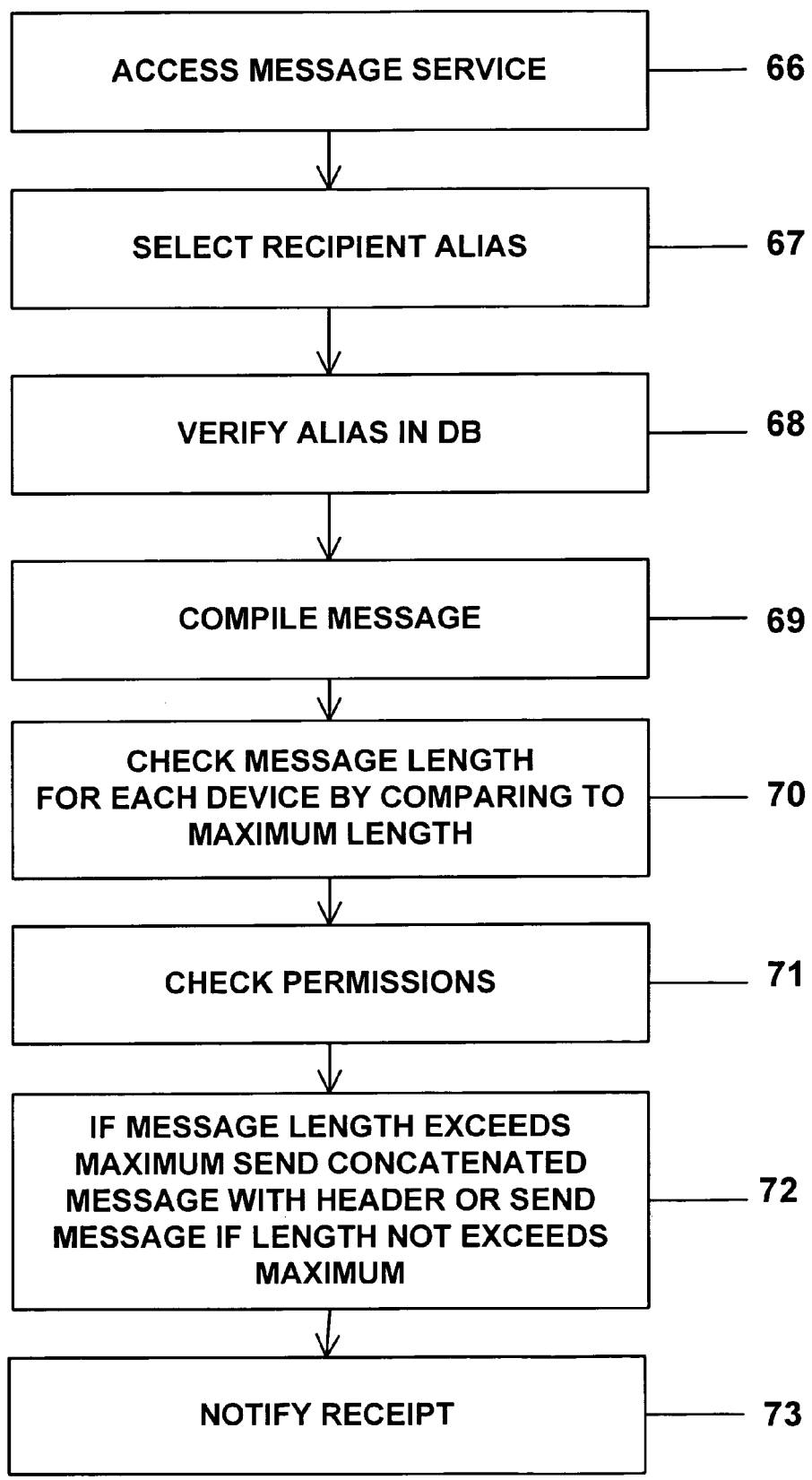
FIG. 4 is a flow diagram illustrating a process for transmitting a message to a user by employing the system of FIG. 1.

FIG. 4 is a flow illustration of a message transmission processing. The sender employs the sender system to establish a connection with the message system (step 66). Preferably, the sender system transmits a request to the message system. In another embodiment, the message is provided to the system by voice communication and voice commands. The message may also be provided by HTTP, fax, WAP, Bluetooth communication, or other wireline or wireless protocol.

In the web implementation, the message system responds by transmitting a web-page to the sender system. The web-page preferably includes controls that are employed to enter data for the transmission of a message. In another embodiment, a plurality of web-pages are provided to the sender system to facilitate the illustrated process. The web-pages preferably include hyperlinks to allow users to search for user data, such as aliases and device addresses. In yet another embodiment, the thin-client application on the user system receives data indicating that a connection is established.

The sender selects a recipient alias by employing the sender system (step 61). In one embodiment, the web-page includes an interactive search control for quickly retrieving aliases by entering the first few characters of an alias. In another embodiment, the sender enters an alias into a text box. The message system receives the alias and searches the aliases database for the alias. The message system verifies that the alias is in the system (step 68). Preferably, if the alias is not in the system, the sender system is notified accordingly. If the alias is in the system, the sender compiles a message (step 69). In another embodiment, the sender loads a pre-compiled message onto the message system. For example, the message may include a video or image that is loaded onto the system.

The message system receives the message and performs a length checking operation (step 10). The message system retrieves a maximum message length for each device associated with the alias. If the complied message length is greater than the maximum message length for any of the intended devices, the message system informs the sender system. The sender can then direct the system to send the message in parts (if available) or send a shorter message (at least with respect to those limited devices).

Once message length is checked for all recipient devices, the message system checks the permission criteria associated with the recipient alias if a permission criteria is defined for the alias (step 71). In another embodiment, the message system also checks the permission criteria associated with each recipient device. The message is then transmitted in accordance with the result of the permission procedure (step 72). If the recipient device is able to generate notifications, the sender is provided with the notification data after it is received by the message system (step 73).

The message system archives messages that are transmitted over the system. In one embodiment, when a message is received into the system, a time-in stamp is applied to the message. In addition, a time-out stamp is preferably applied to the message when it is transmitted to the intended recipient. The system can provide the time-stamp data to senders so as to allow for the tracking of messages.

In one embodiment, the message system performs format conversion for the message in accordance with the recipient device. For example, a voice message is converted to a text message when delivered to a text messaging device. Likewise, a text message is converted to a voice message when delivered to a voice only device. The message system employs known text-to-speech and speech-to-text methods to facilitate the conversion of message data. Format conversions are also provided by the system to ensure proper transmission and reception of the message.

The message is preferably transmitted by employing the protocol associated with each device and the service network for each device. In one embodiment, the message is transmitted at real-time, whereby the message is forwarded to the recipient system without imposing any outside delay. The message system can also delay a message until a designated time or for a predetermined period.

In one example scenario, a sender may designate that a message is to be provided to a recipient at 4 pm on January $5^{th}$. Instead of waiting until the designated time and day to compose the message and send the message to the recipient, the sender can pre-compose a message and designate a delivery schedule. In one embodiment, the delayed message is an order to a merchant that requests the delivery of goods or services. For example, a sender may want to have flowers sent to his wife on her birthday. Accordingly, the sender composes a message to the vendor, in advance, ordering the flowers. The sender schedules the delivery of the message at the appropriate time by providing corresponding data to the message system.

In another embodiment, the message system has access to the sender calender application. The message system parses the calender data, searching for birthdays, for example. The message system then provides a listing of all the events retrieved from the calender and prompts the user to define corresponding actions. The message system can alternatively automatically order flowers for the person by transmitting an order to a vendor. The message system may also have access to the user's address book. Accordingly, the message can include the address of the birthday person if the user has an address stored for that person in the address book.

In another embodiment, the message system extracts appointments from the schedule. Reminder messages regarding the appointments are then sent to devices selected by the user. The user may also define an alias for appointment reminders. For example, the reminder appointment alias may include a pager and a mobile phone.

Figure 5:
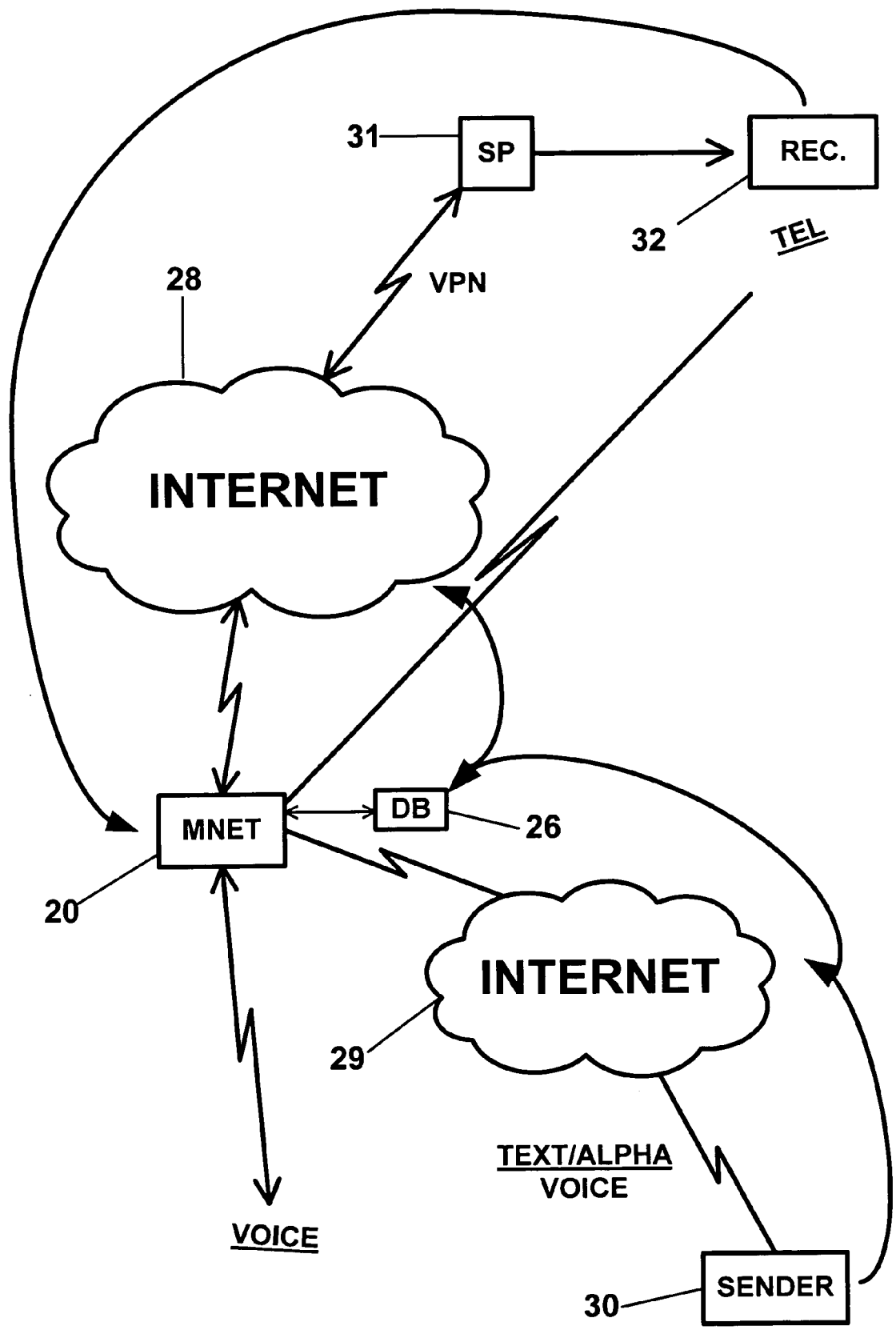
FIG. 5 is an illustration of progress of a message between components of the client-server system of FIG. 1.

FIG. 5 illustrates the flow of a message from a sender device 30 to a recipient device 32. A message is composed by a sender on a sender device 30. The message is transmitted to a message database 26 in the message system 20 by employing a network connection 29. In the example provided, the network connection 29 is an internet connection. The message is received by the message system 20 and is directed in accordance with the information associated with the recipient alias. In the illustrated example, the recipient alias is associated with a device 32 on a service network that is coupled to the message system by a network connection 28 (Internet). Accordingly, the message is transmitted to the recipient device 32 by employing the network 28. The service provider 31 receives the message from the network and forwards it the intended recipient 32. The recipient device 32 may include the ability to generate receipt notifications, in which case the notification is transmitted to the message system 20 by employing the network connection 28. The receipt notification is preferably then made available to the sender.

In an alternate embodiment, the sender system stores aliases that are converted by the sender application to globally unique aliases. The sender can generate its own set of aliases for recipients. The aliases are only unique as with other aliases defined for the particular sender. Several senders may employ the same alias to refer to different globally unique aliases. Accordingly, the sender is allotted a greater degree of freedom in tracking recipient aliases by having the ability to generate a second level of alias association.

Figure 6:
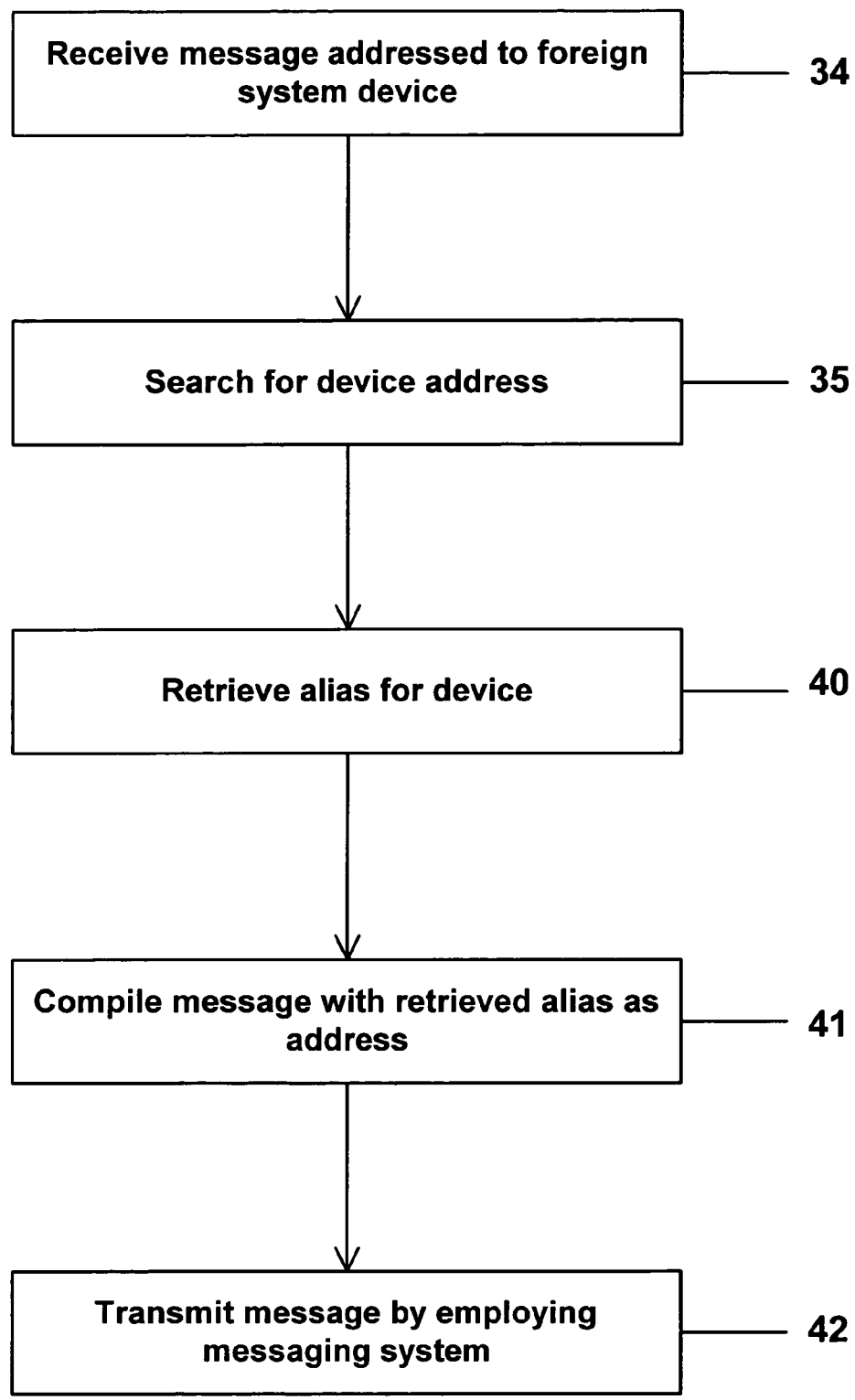
FIG. 6 is a flow diagram illustrating a process for transmitting a message to a device on a foreign network.

FIG. 6 is a flow diagram illustrating the transmission of a message from a subscriber of a first system to a subscriber of a second system. For example, the two systems may provide two-way messaging services to users. A user of the first system may wish to transmit a message to a user of the second system. The two systems are not coupled to one another and cannot directly communicate messages. In addition, the two systems do not have information regarding devices and addresses for users of the other system. The present invention facilitates the transmission of messages between such disparate systems.

The first system has available device addresses and corresponding aliases. In one embodiment, a local database stores the device addresses and corresponding aliases. In another embodiment, the first system has access to such data by a communication link preferably, the device addresses and aliases are provided by the message system. A message is received by the first system that has an address of a user device on a foreign system, one that is not directly accessible to the first system (step 34). The second system may be foreign because of a different protocol employed or because of the unavailability of a communication link between the two systems. The first system searches for the device address of the received message (step 35). When the device address is found, the corresponding alias is retrieved (step 40). The retrieved alias is then used in place of the device address of the message (step 41). The message is transmitted to the message system 20 as discussed above with reference to FIG. 4 (step 42). In another embodiment, the message system 20 has a Virtual Private Network connection with the service providers that is used to communicate message data to and from the service provider networks.

In another embodiment, the first system receives a message that is directed to an alias. The system searches for the alias in the user records. The device data associated with the alias is retrieved. The system then sends the message to the devices associated with the alias by transmitting an e-mail message to the second system's service provider. Accordingly, service providers can employ the aliases of the message system to directly transmit messages to recipients. In other embodiments, the system transmits the message by employing any of a number of means such as TCP/IP, ATM, Frame Relay or any of these via a VPN.

Although the present invention was discussed in terms of certain preferred embodiments, the description is not limited to such embodiments. Rather, the invention includes other embodiments including those apparent to a person of ordinary skill in the art. Thus, the scope of the invention should not be limited by the preceding description but should be ascertained by reference to the claims that follow.

What is claimed is:

1. A method for transmitting a message to a recipient, the recipient associated with at least one identifier, the identifier is associated with at least one communication device, comprising:

receiving a message;

receiving a recipient identifier for said message, the recipient identifier associated with at least one communication device;

verifying that the recipient identifier is available to the system;

verifying that the sender has permission to send a message to the identifier by referring to the permission associated with the identifier;

transmitting the message to at least one communication device associated with the identifier;

retrieving a maximum message length for a communication device associated with the identifier;

determining the message length of the received message;

comparing the message length of the received message to the maximum message length; and modifying the transmission of the message when the message length of the received message exceeds the maximum message length by sending a concatenated message.

2. A method for transmitting a message to a recipient, the recipient associated with at least one identifier, the identifier is associated with at least one communication device, comprising:

receiving a message;

receiving a recipient identifier for said message, the recipient identifier associated with at least one communication device;

verifying that the recipient identifier is available to the system;

verifying that the sender has permission to send a message to the identifier by referring to the permission associated with the identifier;

transmitting the message to at least one communication device associated with the identifier;

retrieving a maximum message length for a communication device associated with the identifier;

determining the message length of the received message;

comparing the message length of the received message to the maximum message length; and modifying the transmission of the message when the message length of the received message exceeds the maximum message length by sending a concatenated message and adding a header to the message.

* * * * *